(12) United States Patent
Muff et al.

(10) Patent No.: US 9,507,599 B2
(45) Date of Patent: Nov. 29, 2016

(54) INSTRUCTION SET ARCHITECTURE WITH EXTENSIBLE REGISTER ADDRESSING

(71) Applicant: GLOBALFOUNDRIES Inc., Grand Cayman (KY)

(72) Inventors: Adam J. Muff, Woodinville, WA (US); Paul E. Schardt, Rochester, MN (US); Robert A. Shearer, Woodinville, WA (US); Matthew R. Tubbs, Issaquah, WA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 675 days.

(21) Appl. No.: 13/947,734

(22) Filed: Jul. 22, 2013

(65) Prior Publication Data
US 2015/0026435 A1 Jan. 22, 2015

(51) Int. Cl.
*G06F 9/00* (2006.01)
*G06F 9/30* (2006.01)

(52) U.S. Cl.
CPC ......... *G06F 9/3012* (2013.01); *G06F 9/30098* (2013.01)

(58) Field of Classification Search
CPC .................. G06F 9/30098; G06F 9/3012
See application file for complete search history.

(56) References Cited

U.S. PATENT DOCUMENTS

| | | | |
|---|---|---|---|
| 5,680,632 A | 10/1997 | Studor et al. | |
| 6,052,766 A * | 4/2000 | Betker | G06F 9/30098 711/200 |
| 6,349,380 B1 | 2/2002 | Shahidzadeh et al. | |
| 6,651,160 B1 | 11/2003 | Hays | |
| 7,676,654 B2 | 3/2010 | Kling | |

* cited by examiner

*Primary Examiner* — Zachary K Huson
(74) *Attorney, Agent, or Firm* — Anthony Canale; Andrew M. Calderon; Roberts Mlotkowski Safran Cole & Calderon P.C.

(57) ABSTRACT

A method and circuit arrangement selectively source and/or write data from/to extended registers of an extended register file based in part on whether an operand address of an instruction references a primary register of primary register file configured to store a pointer to the extended register. Control logic connected to the primary register file and the extended register file determines whether the operand address references a primary register configured to store a pointer, and responsive to the determination, the control logic causes execution logic to selectively source and/or write data from/to the extended register pointed to by the pointer stored in the referenced primary register.

23 Claims, 8 Drawing Sheets

INSTRUCTION SET ARCHITECTURE WITH EXTENSIBLE REGISTER ADDRESSING

FIELD OF THE INVENTION

The invention is generally related to data processing, and in particular to instruction set architectures for processors and computers incorporating the same.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an operational code, or opcode, that identifies the type of instruction, (i.e., the type of operation to be performed when the instruction is executed), as well as one or more operand addresses (i.e., operands) that identify/reference input and/or output (i.e., source and target) data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well (e.g., an address), so as the number of registers increases, the number of bit positions in operands of each instruction required to identify/reference all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

Implementing a register file of 128 registers using 32-bit instructions is even more problematic. If, for example, some of the instructions in a class of an instruction set architecture required three source registers and one target register, the operands would require 28 bits (7 bits per operand), only four bits would be available for any primary and/or secondary opcode. Thus, for example, if four bits were required for a primary opcode to identify a particular instruction class, that instruction class would be limited to a single instruction, since there would be no space for any secondary or extended opcode.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by providing a method and circuit arrangement that support extended register addressing (i.e., larger register files) in fixed length instruction architectures while limiting bits of instructions dedicated to operand addresses. Consistent with embodiments of the invention, an extended register file comprising a plurality of extended registers and a primary register file comprising a plurality of registers may be coupled to an execution pipeline including execution logic for executing instructions. The plurality of registers of the primary register file may include first and second subsets. The first subset of registers may be configured to store data that points to an extended register of the extended register file, i.e., the first subset of registers may store pointers that point to extended registers of the extended register file. The second subset of registers may be configured to store data that may be used as source/target operands for execution with an instruction. Control logic may be coupled to the primary register file and the extended register file and configured to cause data to be selectively sourced/written to/from the extended register file based on whether an instruction references the first subset of registers of the primary register.

Consistent with embodiments of the invention, when an instruction is decoded in the execution pipeline, the control logic determines whether any operand addresses of the instruction reference a register of the first subset of registers of the primary register file. For any operand address that references a register of the first subset, the control logic causes data to be sourced and/or written from and/or to an extended register of the extended register file. In particular, the register of the first subset referenced by the operand address may be accessed and the data stored therein is used as a pointer to determine the particular extended register from/to which to source/write data. Therefore, the control logic may selectively source data for an instruction from an extended register based on whether an operand address of the instruction references a register of a primary register file that is configured to store a pointer to the extended register of an extended register file.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention provide a circuit arrangement an method that selectively source and/or write data for execution of an instruction to an extended register file based at least in part on whether the instruction references a register of a primary register file that is configured to store a pointer to an extended register of the extended register file. Consistent with embodiments of the invention, an instruction may be processed in an execution pipeline for execution by execution logic of the execution pipeline. Control logic of the execution pipeline causes the execution logic to source and/or write data to either a primary register file or an extended register file based on operand addresses of the instruction. In general, the primary register file includes a plurality of registers. A first subset of the registers of the primary register file may be configured to store data that points to an extended register of the extended register file. A second subset of the registers may be configured to be utilized as source and/or target operands for instructions executed in the execution pipeline.

Hence, when an instruction is decoded by instruction decode logic of the execution pipeline, the control logic may determine whether the instruction references the first subset of registers of the primary register file, i.e., whether an operand address corresponds to a register in the first subset of registers of the primary register file. If an operand address corresponds to the first subset of registers, the control logic may access the referenced register and use data of the referenced register as a pointer to an extended register of the extended register file. Put another way, the referenced register stores a data value that is an address corresponding to the extended register. The extended register corresponding to the pointer may be used when executing the instruction with the execution logic.

Other variations and modifications will be apparent to one of ordinary skill in the art. Therefore, the invention is not limited to the specific implementations discussed herein.

Hardware and Software Environment

Figure 1:
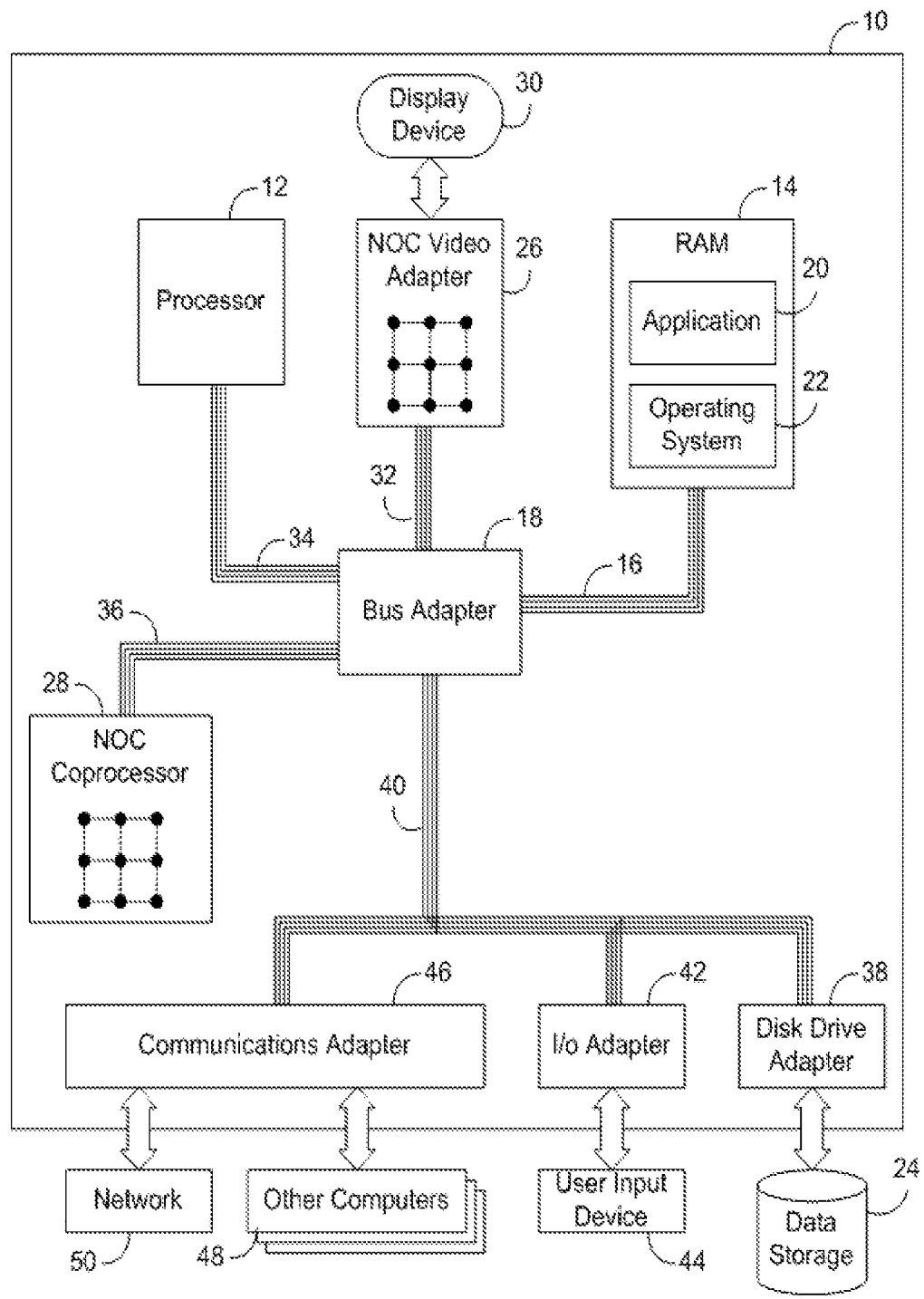
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
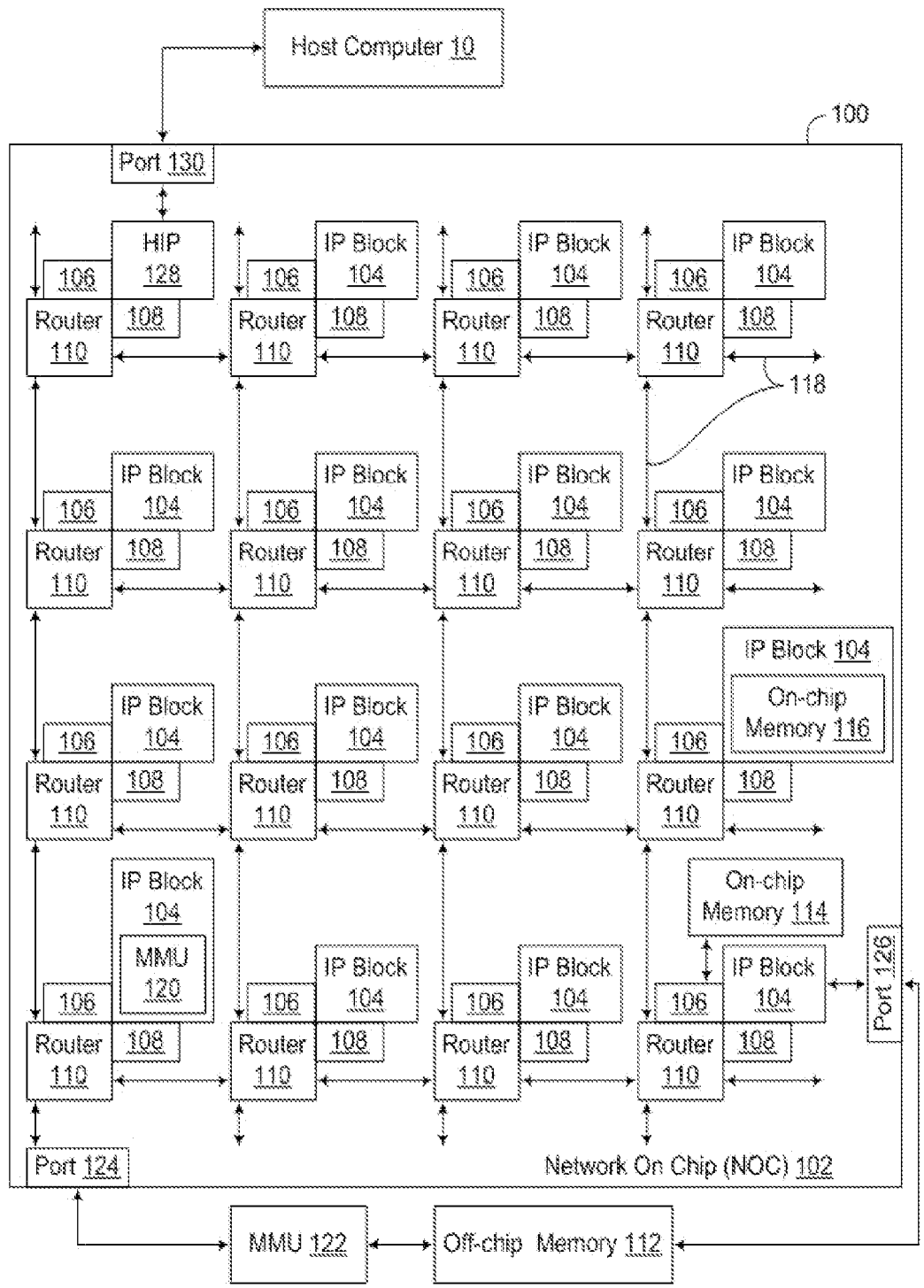
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
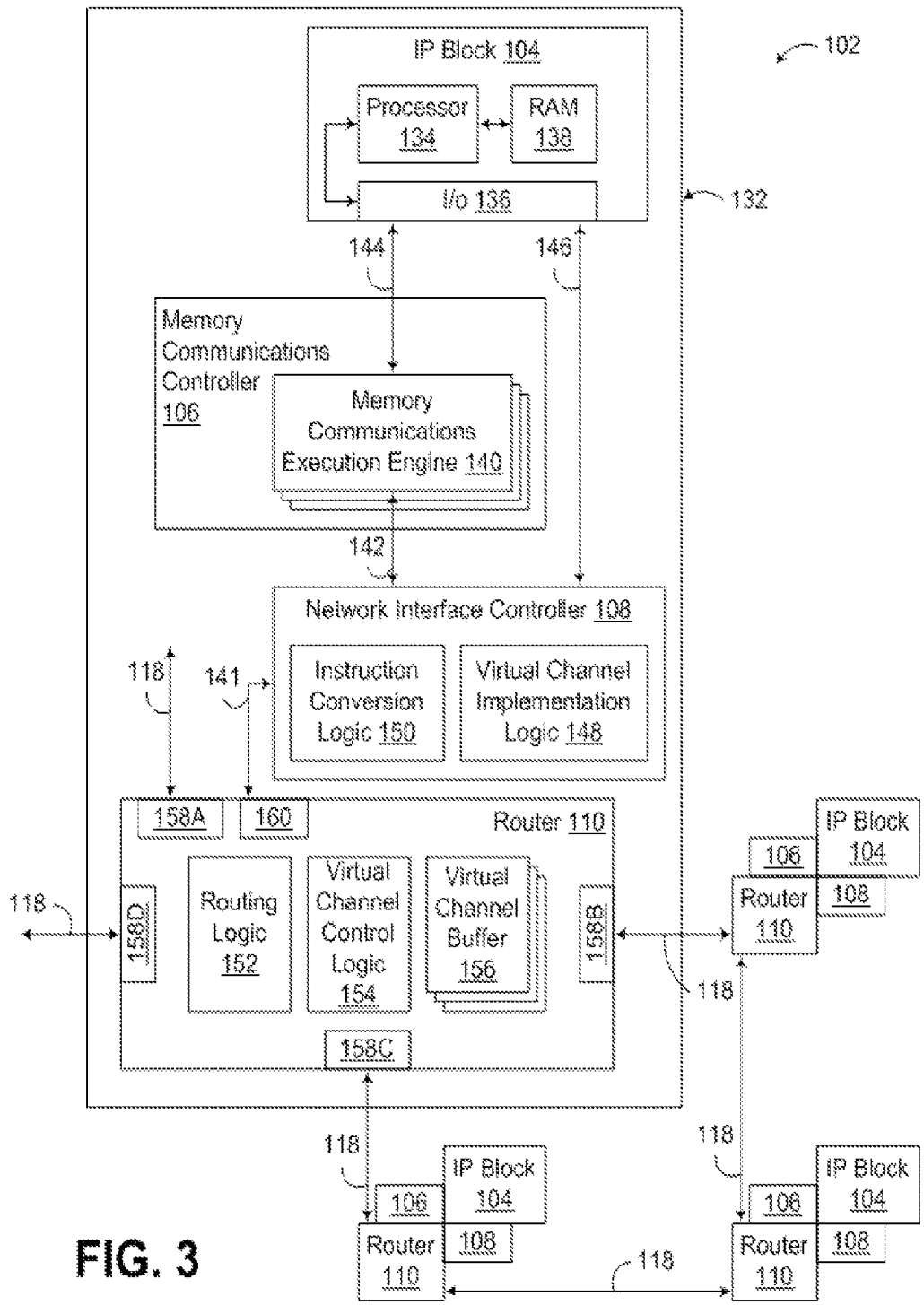
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
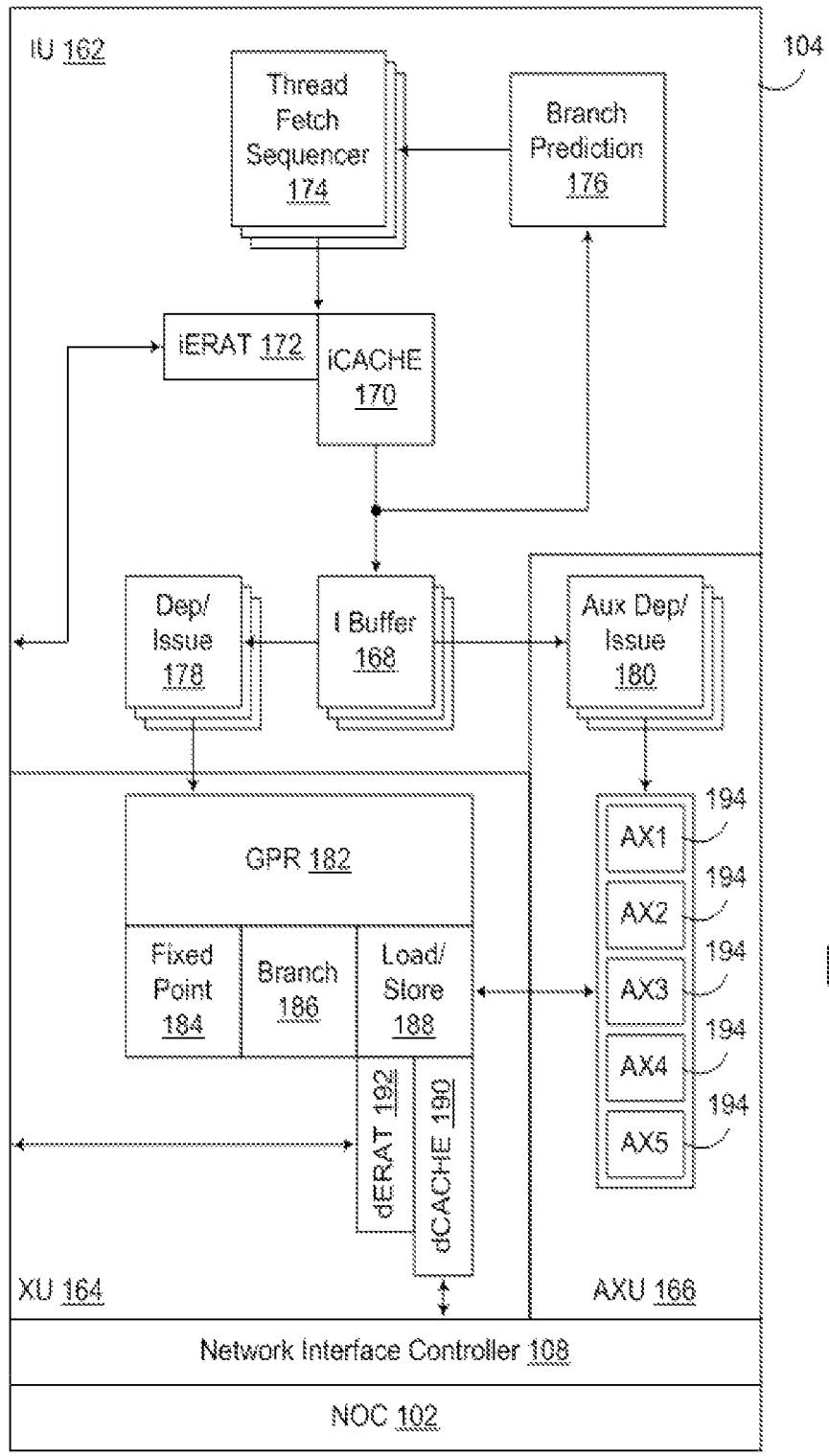
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Extended Register Addressing

Processor instructions have an opcode for each type of operation that is represented by a unique bit pattern in the data that makes up the instruction. Due to the ever expanding number of registers in modern processor cores, the address widths present in the instruction encoding continue to widen, taking up valuable instruction encoding space for adding new instruction decodes. Additionally, it is typically desirable that all instructions have the same fixed width in a microprocessor architecture. Introducing variable width instructions often causes great design complexity that would impact performance negatively.

If, for example, it was desirable to add a new class of instructions to an instruction set architecture such as the existing Power instruction set architecture to support 128 registers, each address width in the new instructions would equal 7. In addition, if some of the new instructions needed to address three source registers (VA, VB, VC) and one target register (VT), 28 bits, 21 bits for the source operand addresses and 7 bits for the target operand address, would be needed. As such, there would only be a total of four bits available for any primary and/or secondary opcode. Similarly, if for example, operand address widths were equal to 5 bits each for a total of 20 bits, such that 12 bits may be utilized for the primary and secondary opcodes, only 32 (i.e., $2^5$) registers would be addressable.

For instance, it may be desirable for a new instruction class to include floating point instruction types that perform addition, subtraction, multiplication, fused multiply-add operations, division, exponentiation, trigonometric operations, comparison operations, and others. One conventional approach to address this situation would be to make the 3-source operations destructive, meaning the target and one source address would be implicitly equal, such that one address field in the above example would not be needed, freeing up space for additional extended opcodes. But these destructive operations are often not convenient for compilers and software engineers, because often times an extra copy of the source data that would be overwritten by the destructive operation needs to be saved away in a temporary register, which can have potential performance problems in addition to using valuable temporary register space.

One major reason why instruction set architectures strive for large numbers of registers is so that loops can be "unrolled" to minimize branch misprediction performance penalties, and may also in certain cases be used to minimize the performance impact of dependent instructions. The large numbers of registers are needed to do "spills and fills" of data without reusing the same register in a loop. Consider the following example equation (1) where a long Taylor series approximation is computed for sin(x) with many iterations:

$$\sin(x) \approx x - \frac{x^3}{3!} + \frac{x^5}{5!} - \frac{x^7}{7!} + \frac{x^9}{9!} - \frac{x^{11}}{11!} + \frac{x^{13}}{13!} - \frac{x^{15}}{15!} \quad (1)$$

Table I below, for example, illustrates a first loop unrolling, while Table II below illustrates the results of loop unrolling twice, where registers f1 through f10 are used for the most significant part of the approximation, and f11 thru f20 are used for the least significant (starts with the $x^{13}/13!$ term), and they are summed together at the end:

TABLE I

| Instruction sequence for Taylor series approximation | |
|---|---|
| # initially: | |
| # f1, f2, f10 contain x | |
| # f3, f4, f6, f8 contain 1.0 | |
| # f7 contains −1.0 | |
| loop:   fmul f2, f1, f2 | # f1 contains x, initially f2 contains x also |
| fmul f2, f1, f2 | # f2 now contains x raised to the desired exp |
| fadd f3, f3, f6 | # increment the counter, initially contains 1 |
| fmul f4, f3, f4 | # f4 contains the running factorial, init 1 |
| fadd f3, f3, f6 | # increment the counter |
| fmul f4, f3, f4 | # f4 contains the running factorial |
| fdiv f5, f6, f4 | # f5 now has the reciprocal of the factorial |
| fmul f8, f7, f8 | # flip the sign appropriately |
| fmul f9, f5, f2 | # multiply the reciprocal with the x component |
| fmadd f10, f9, f8, f10 | # correct the sign and add to the sum in f10 |
| fcmp f3, end | # compare counter (exponent) to end |
| blt loop | # branch back to loop if f3 < end |

TABLE II

| Instruction sequence with loop unrolling twice | |
|---|---|
| # initially: | |
| # f1, f2, f10 contain x | |
| # f3, f4, f6, f8 contain 1.0 | |
| # f7 contains −1.0 | |
| # f11, f12, f20 contain x | |
| # f13, f14, f16, f18 contain 1.0 | |
| # f17 contains −1.0 | |
| # end contains 5 | |
| loop:   fmul f2, f1, f2 | # f1 contains x, initially f2 contains x also |
| fmul f12, f11, f12 | # |
| fmul f2, f1, f2 | # f2 now contains x raised to the desired exp |
| fmul f12, f11, f12 | # |
| fadd f3, f3, f6 | # increment the counter, initially contains 1 |
| fadd f13, f13, f16 | # |
| fmul f4, f3, f4 | # f4 contains the running factorial, init 1 |
| fmul f14, f13, f14 | # |
| fadd f3, f3, f6 | # increment the counter |
| fadd f13, f13, f16 | # |
| fmul f4, f3, f4 | # f4 contains the running factorial |
| fmul f14, f13, f14 | # |
| fdiv f5, f6, f4 | # f5 now has the reciprocal of the factorial |
| fdiv f15, f16, f14 | # |
| fmul f8, f7, f8 | # flip the sign appropriately |
| fmul f18, f17, f18 | # |
| fmul f9, f5, f2 | # multiply the reciprocal with the x component |
| fmul f19, f15, f12 | # |
| fmadd f10, f9, f8, f10 | # correct the sign and add to the sum in f10 |
| fmadd f20, f19, f18, f20 | # correct the sign and add to the sum in f20 |
| fcmp f3, end | # compare counter (exponent) to end |
| blt loop | # branch back to loop if f3 < end |
| fadd f10, f10, f20 | # sum |

Note that to minimize branch mispredict penalties, loops and other performance reasons it would be desirable to unroll further than two times typically, but for brevity's sake the example shown above is only unrolled two times. Note that to unroll the loop 4 times, approximately 40 registers would be needed, which would push the limits of many architectures. Notice also in the example above that there is a long string of floating-point only instructions that have the same primary opcode. It will also be appreciated that other types of algorithms benefit from loop unrolling and large register files, e.g., rasterization, fast Fourier transforms, etc.

Embodiments consistent with the invention utilize specialized hardware control logic that uses data stored at a subset of registers of a primary register file as pointers that point to extended registers of an extended register file. When an instruction that includes an operand address that references a register of the subset is decoded for execution, the control logic uses data stored at the register referenced by the operand address as a pointer. The control logic causes execution logic executing the instruction to source data from the pointed to extended register and/or write data to the pointed to extended register when executing the instruction.

Figure 5:
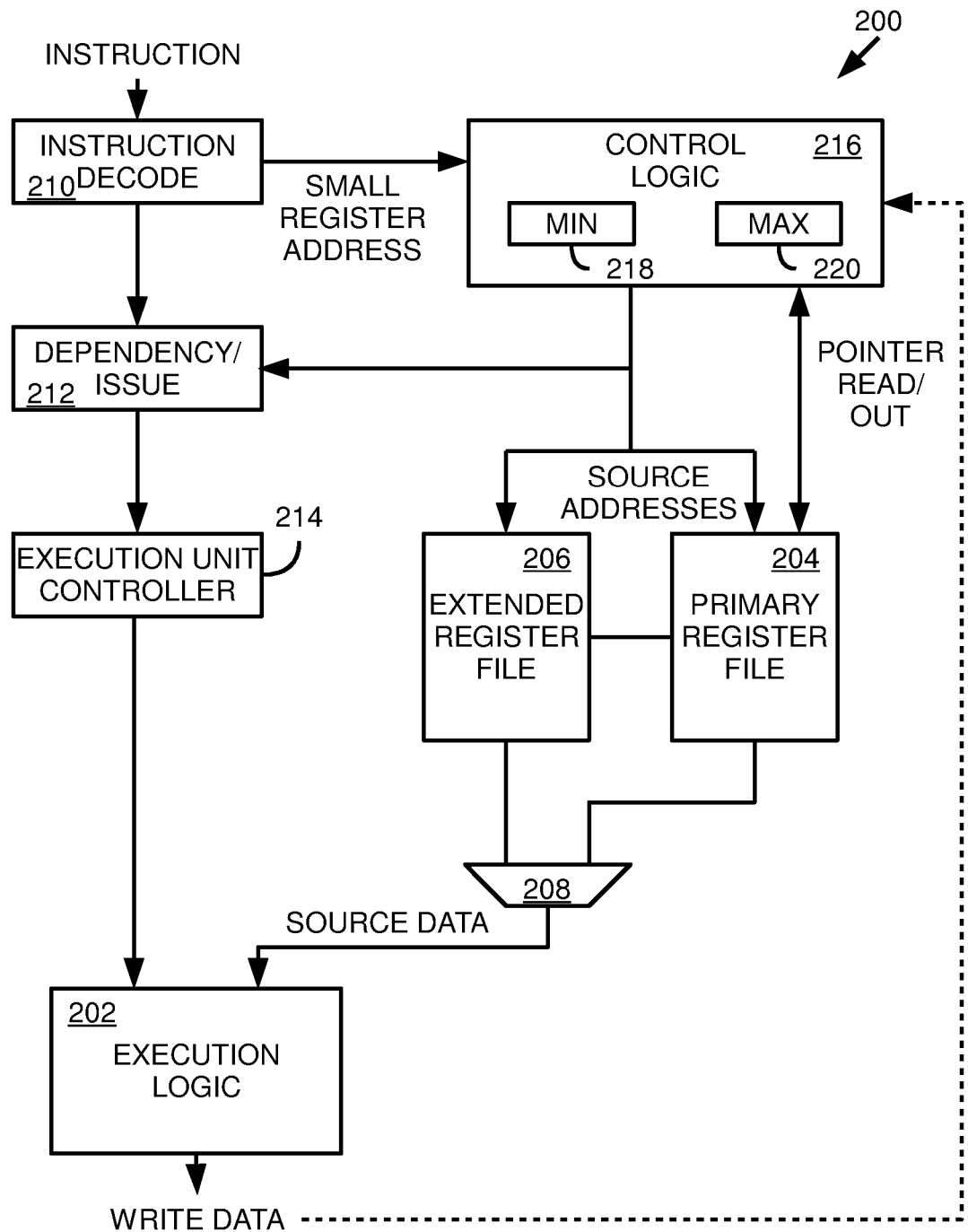
FIG. 5 is a block diagram illustrating an exemplary implementation of a data processing system incorporating an extended register file and control logic consistent with embodiments of the invention connected to execution logic.

Turning now to FIG. 5, this figure illustrates components of an exemplary data processing system 200 suitable for implementing extensible register addressing consistent with embodiments of the invention. As shown, the data processing system 200 includes execution logic 202 for executing instructions with sourced data to generate write data that may be stored to memory. Consistent with embodiments of the invention, a primary register file 204 and an extended register file 206 may be connected to the execution unit 202 through multiplexing logic 208 such that data may be input to the execution logic 202 as source data corresponding to an operand of an instruction for execution with the instruction by the execution logic 202. Instruction decode logic 210, dependency/issue logic 212 and an execution unit controller 214 are connected to the execution logic 202 for decoding and issuing instructions to the execution logic 202 for execution thereby. Consistent with embodiments of the invention, control logic 216 may be connected to the execution logic 202, instruction decode logic 210, dependency/issue logic 212, execution unit controller 214, primary register file 204 and/or extended register file.

The control logic 216 may be configured to receive operand addresses from the instruction decode logic 210 when an instruction is decoded by the instruction decode logic 210. In general, the control logic 216 is configured to determine whether operand addresses of each instruction reference registers of the primary register 204 that are configured to store pointers to extended registers of the extended register file 206. In this example embodiment, the control logic 216 includes a minimum address value register 218 (also referred to herein as the "min register") and a maximum address value register 220 (also referred to herein as the "max register) that may be set to thereby define a range of address corresponding to registers of the primary register file 204 that are configured to store pointers to extended registers of the extended register file 206.

For example, if the primary register file comprises 32 registers corresponding to 32 register addresses (i.e., f0-f31), the min/max registers 218, 220 may store values that define a range of addresses corresponding to a subset of registers of the primary register file 204 that are configured to store pointers to extended registers of the extended register file 206. For example, if half of the 32 registers of the primary register were to be used for storing pointers to the extended registers, the min register 218 may store the register address f16 (i.e., the binary value equivalent to the floating point value '16'), and the max register 220 may store the register address f31 (i.e., the binary value equivalent to the floating point value '31'), such that the registers of the primary register file 204 corresponding to the range of addresses f16 to f31 are identified as storing pointers to extended registers of the extended register file 206.

While in FIG. 5, the control logic 216 may access registers that store a minimum address value 218 and a maximum address value 220, other configurations may be configured consistent with embodiments of the invention. For example, the control logic 216 may access a register that stores a bit map that identifies registers of the primary register file 204 configured to be used as pointers to extended registers of the extended register file 206. Moreover, data values to be used as pointers stored in registers of the primary register file 204 may be set by preceding instructions in an instruction stream. In addition, the min register 218 and max register 220 may be similarly set by instructions in the instruction stream such that the number of registers of the subset configured to store pointers to the extended register file may be adjusted by software during execution of instructions. Also, in some embodiments a min or max may be fixed, e.g., so that a single register may be required (e.g., so that the range may start at register r0 and end at the register identified in a max register.

Figure 6:
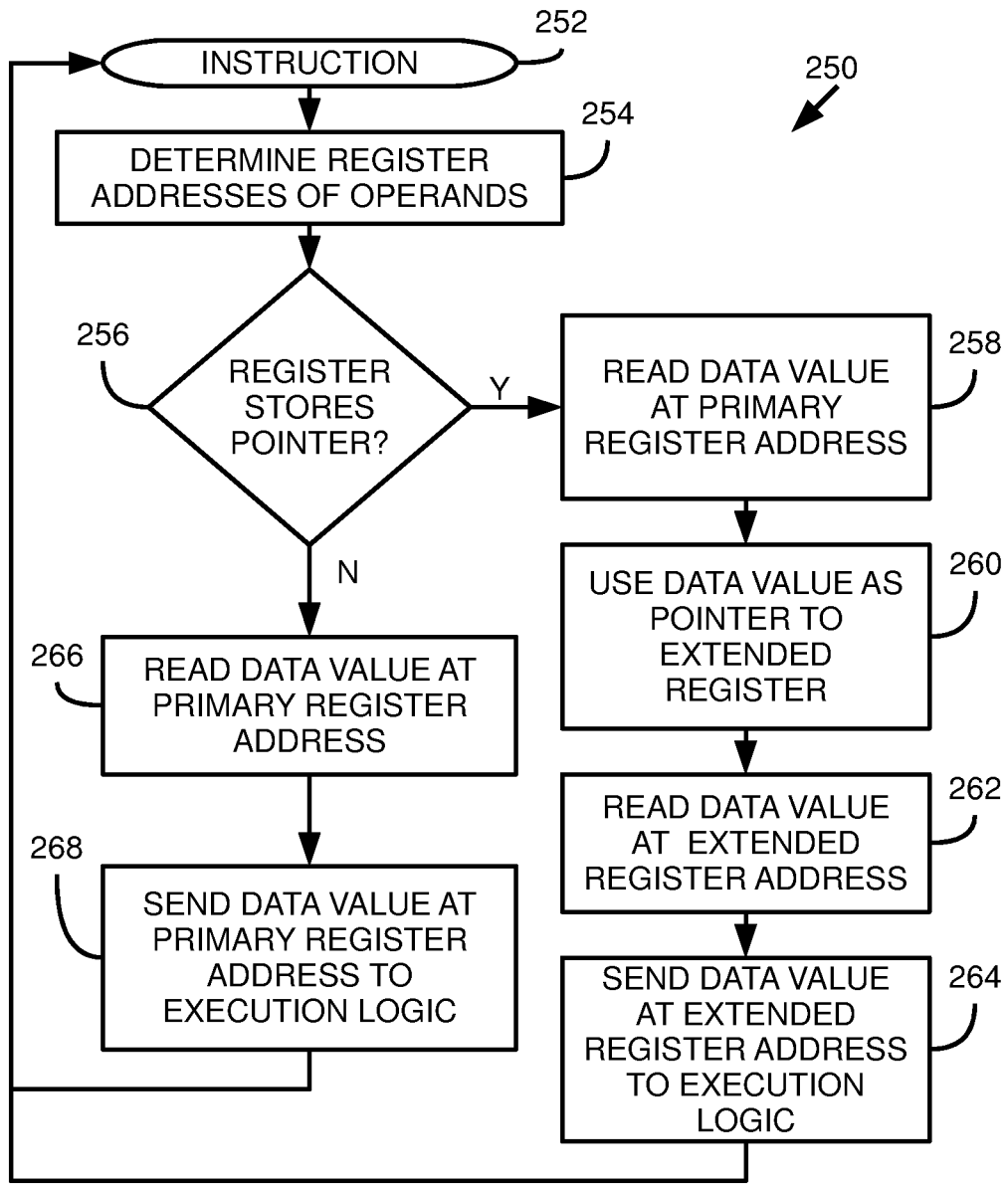
FIG. 6 is a flowchart illustrating a sequence of operations that may be performed by the data processing system of FIG. 5 for selectively sourcing data from the extended register file.

Turning now to FIG. 6, this figure provides a flowchart 250 that illustrates a sequence of operations that may be performed by the data processing system of FIG. 5 consistent with embodiments of the invention to selectively source data from an extended register file consistent with embodiments of the invention. An instruction may be received and decoded (block 252) and control logic of the data processing system may determine the register addresses of the operands of the instruction (i.e., operand addresses) (block 254). The control logic determines whether any of the operand addresses of the instruction reference registers of a primary register file that are configured to store pointers (block 256). As discussed previously, the control logic may access registers that store a minimum and maximum register address that corresponds to a range of register addresses that are configured to store pointers. In other embodiments, the control logic may access a register that stores a bit map that indicates registers of the primary register that store pointers. In other embodiments, determining whether an operand address references a register that stores a pointer may be based at least in part on the instruction. For example, only particular types of instructions may utilize the extended register file, and in response to decoding an instruction of the particular type, the control logic may determine that an operand address references a register that stores a pointer to an extended register. Other embodiments of the invention may utilize other methods for identifying registers of the primary register file that are configured to store pointers to an extended register.

In response to determining that a register referenced by an operand address of the instruction stores a pointer to an extended register of an extended register file of the data processing system ("Y" branch of block 256), the control logic may read a data value stored at the register corresponding to the operand address (block 258), and use the data value as a pointer to an extended register of an extended register file (block 260). A data value at the extended register address corresponding to the pointer may be read (bloc 262) and communicated to execution logic as source data for the instruction (block 264). Returning to block 256, if operand addresses of the instruction do not correspond to registers of the primary register file configured to store pointers ("N" branch of block 256), the control logic may read a data value stored at each register referenced by the operand addresses (block 266), and the data values may be communicated to the execution logic as source data for the instruction (block 268). Hence, as illustrated by the flowchart 250, based on an address of an operand of an instruction, data may be selectively sourced from the primary register file or the extended register file.

Figure 7:
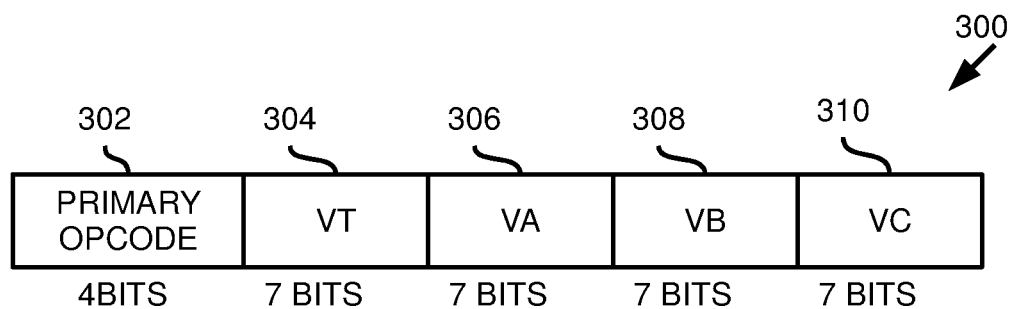
FIG. 7 is a block diagram instruction format for a stored instruction.
Figure 8:
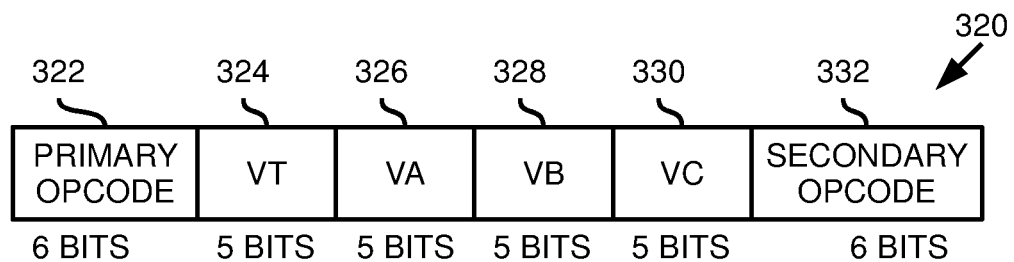
FIG. 8 is an exemplary block diagram instruction format for a stored instruction that may be processed by the data processing system of FIG. 5.

Moreover, by configuring a subset of registers of the primary register file to store pointers to extended registers of the extended register file, the number of bits of an instruction used for operands may be minimized compared to a conventional system in which the bit width of operands generally corresponds to the number of registers that may be referenced by instructions. For example, FIGS. 7 and 8 illustrate exemplary instruction layouts 300, 320 for non-destructive 32-bit instructions. As shown in FIG. 7, the exemplary instruction layout 300 includes a primary opcode portion 302 comprising 4 bits, a target operand portion (VT) 304 comprising 7 bits that stores an operand address for a target register, and three source operand portions (VA, VB, VC) 306-310 comprising 7 bits that store operand addresses for source registers. The instruction layout 300 of FIG. 7 illustrates a possible instruction layout that may be used to reference 128 registers because each operand portion 304-310 comprises 7 bits (i.e., $2^7$). However, due to the bit width of the operands 304-310, only 4 bits may be used for operands, thus limiting the possible number of operands which in turn limits the possible number of different operations that may be performed using this instruction layout 300 to 16 (i.e., $2^4$).

In contrast, FIG. 8 provides an instruction layout 320 that comprises a primary opcode portion 322 of 6 bits, a target operand portion (VT) 324 of 5 bits, source operand portions comprising 5 bits each (VA, VB, VC) 326-330, and a secondary opcode portion 332 comprising 6 bits. In general, if operand addresses are n-bits in an instruction, a primary register file may comprise $2^n$ registers. Hence, in this instruction layout 320, the number of registers that may be referenced is limited to 32 (i.e., $2^5$) but the number of bits used for opcodes is 12 bits, such that the number of different operations that may be performed using the instruction layout is significantly larger compared to the instruction layout 300 of FIG. 7. Moreover, consistent with embodiments of the invention, while the instruction may only reference 32 different registers, by configuring a subset of the 32 registers to store pointers to extended registers of an extended register file, the benefits associated with a larger possible register space may be realized while limiting the number of bits of the instruction used for operand addresses. Moreover, the number of different extended registers that may be referenced corresponds to the number of bits that may be stored at a register of the primary register file. FIG. 8 provides an example instruction layout 320; however embodiments of the invention are not so limited to the instruction layout 320, nor are embodiments of the invention even limited to 32 bit architectures.

Figure 9:
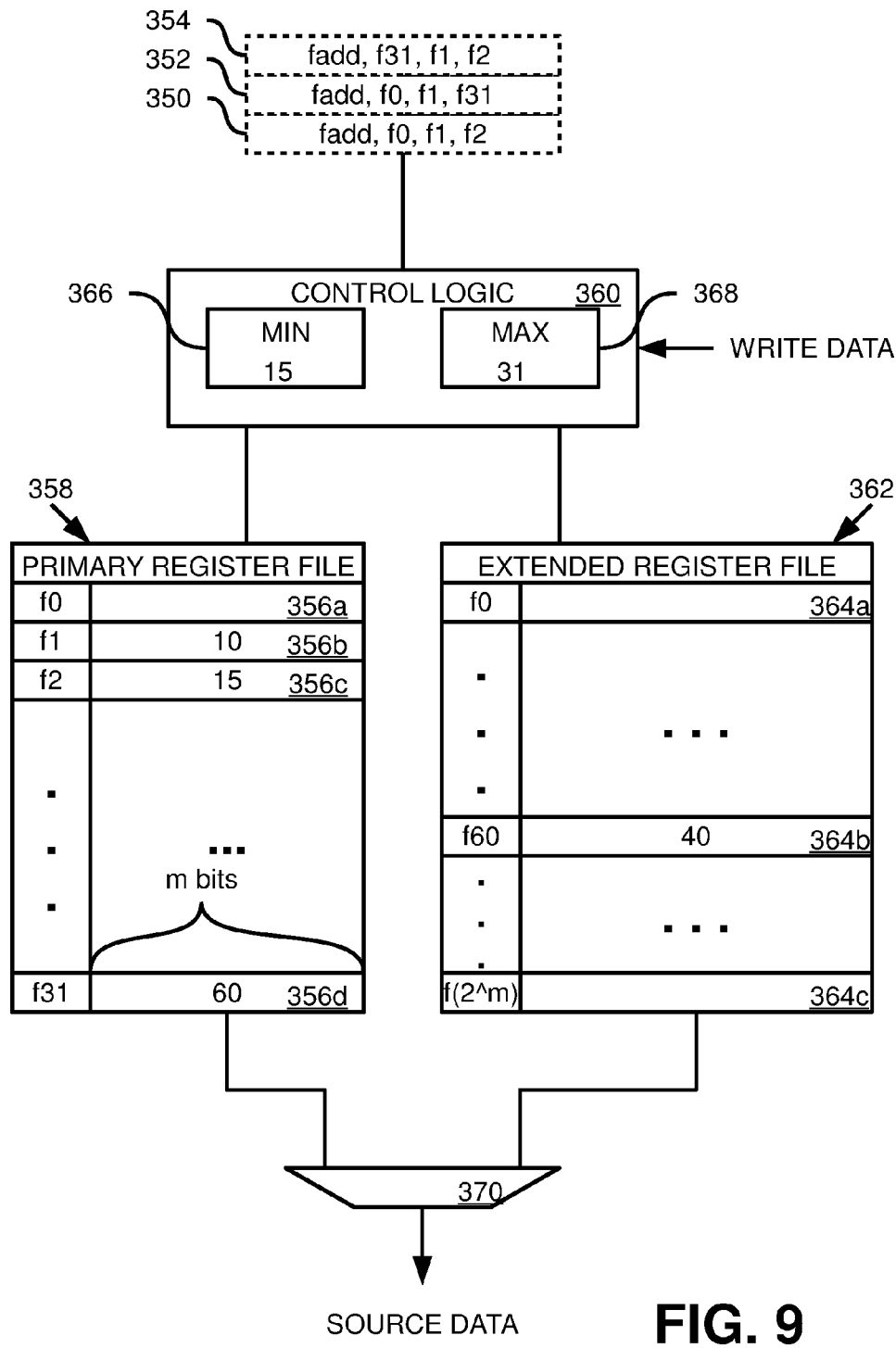
FIG. 9 is a block diagram that illustrates example instructions that may be processed by the data processing system of FIG. 5, where processing may include the selective sourcing/writing of data using the extended register file and control logic.

Turning now to FIG. 9, this figure provides an example embodiment of the invention. The example includes three instructions 350-354 that include an operand address that references registers (f0-f31) 356a-d of a primary register file 358. Control logic 360 is connected to the primary register file 358 and an extended register file 362 comprising a plurality of extended registers (f0-f2$^n$) 364a-364c. As illustrated, if each register 356a-d is configured to store m-bits, then the number of possible extended registers 364a-c in the extended register file 362 may be $2^m$. For example, if each register 356a-d stores 10 bits of data, the extended register file 362 may be configured with a maximum of 1024 extended registers. In this example, the control logic 360 is associated with a minimum address value register (min register) 366 and a maximum address value register (max register) 368. Furthermore, in this example, the bit width dedicated to operand addresses is 5 bits, such that 32 registers 356a-356d may be referenced by an instruction 350-354 which is why the primary register file 358 comprises registers f0-f31 356a-356d. The min register 366 and max register 368 store minimum (i.e., 15) and maximum (i.e., 31) address values to thereby define a range of registers (i.e., f15 to f31) of the primary register file 358 that store pointers to extended registers 364a-c of the extended register file 362. When selectively sourcing data from the primary register file 358 or the extended register file 362 to execution logic for execution with the instruction 350-354, the control logic 360 may communicate data from the primary register file 358 or the extended register file 362 through connected multiplexing logic 370. In addition, data resulting from execution of an instruction (i.e., write data) may be input to the control logic 360 such that the control logic 360 may cause the write data to be stored according to the target operand address of the instruction.

Referring now to a first instruction (fadd, f0, f1, f2) 350 in the example, in response to decoding the first instruction, the control logic 360 may determine whether any operand addresses (i.e., f0, f1, and/or f2) of the first instruction reference registers 356a-d of the primary register file 358 that are configured to store pointers. In this example, the control logic 360 is associated with the min and max registers 366, 368 that define a range of address values (i.e., 15-31) that correspond to a subset of registers configured to store pointers, where the range is defined as f15-f31. Since none of the operand addresses of the first instruction are within the range f15-f31, data is not sourced from the extended register file 362. Using the example values (10 for f1; 15 for f2) stored in the corresponding registers (f1, f2) 356b, 356c, the data values 10 and 15 would be communicated to the execution logic as source data from the corresponding registers f1 356b and f2 356c to perform the floating point addition of f1 and f2 and store the result in f0 (i.e., the target register). Hence, the instruction may cause the floating point addition (10+15) and the result would be stored at f0 (i.e., f1+f2=10+15=25=>f0).

A second instruction (fadd, f0, f1, f31) 352 includes a source operand address within the range f15-f31 defined by the min register 366 and max register 368. Hence, in response to decoding the second instruction 352, the control logic 360 may determine that the operand address f31 of the second instruction 352 references a register (i.e., f31) that is within the range f15-f31. In response to determining that the second instruction references a register that is configured to store a pointer to an extended register 364a-364c, the data value from the referenced primary register is read and used as a pointer to a particular extended register 364a-c. In this example, the register f31 stores the data value 60, which is used as a pointer to an extended register f60 364b. The data value (in this example, the value 40) stored at the extended register f60 364b is read and communicated to execution logic for execution with the second instruction 352 and the result may be stored at the f0 register 356a of the primary register file 358. Hence, with respect to the second instruction, a floating point addition of the data value at f1 (10) of the primary register file 358 and the data value at f60 (40)

of the extended register file 362 is performed and the result (50) (i.e., the write data) is stored at f0 (i.e., f1+f31=10+ 40=50=>f0).

A third instruction (fadd, f31, f1, f2) 354 includes a target operand address within the range f15-f31. Hence, in response to decoding the instruction, the control logic determines that the source operand addresses f1 and f2 are not within the range of f15-31, and the data values stored at f1 and f2 are communicated to the execution logic as source data. However, when the resulting write data is to be stored, the control logic 360 uses the data value (60) stored at the referenced register f31 as a pointer to an extended register (f60) of the extended register file 362 (i.e., f1+f2=10+ 15=25=>extended register f60). Therefore, the example provided in FIG. 9 illustrates the operations that may be performed by control logic 360 based on the operand addresses of instructions.

Consistent with embodiments of the invention, a control logic and extended register file may be connected to an execution pipeline such that extended register space may be accessible by execution logic of the execution pipeline while limiting the bit width of operand addresses in instructions. Hence, embodiments of the invention may be configured such that extended registers may be addressed while maximizing the bit width of operands in instructions, such that benefits associated with larger register space may be realized in addition to benefits associated with maximizing bits for primary/secondary operands in instructions. In addition, embodiments of the invention may be implemented with legacy code without recompiling such code. Hence, performance benefits corresponding to large register files may be realized while also freeing up valuable opcode space for increased numbers of different types of instructions. As one example, the aforementioned Taylor series approximation code discussed above in connection with Tables I and II may be unrolled multiple times and implemented using extended registers of an extended register file 362.

The disclosed invention therefore allows software to read and write data to a larger register space while minimizing the number of bits used in instructions to address such register space. Various additional modifications may be made to the disclosed embodiments without departing from the spirit and scope of the invention. Therefore, the invention lies in the claims hereinafter appended.

What is claimed is:

1. A method for executing instructions comprising:
in response to decoding an instruction that references an operand address, determining whether the operand address references a register among a subset of registers in a primary register file;
selectively sourcing data from an extended register of an extended register file using a pointer stored in the referenced register that references the extended register responsive to determining that the operand address references a register among the subset of registers in the primary register file; and
executing the instruction using the selectively sourced data.

2. The method of claim 1, wherein determining whether the operand address references a register among a subset of registers in a primary register file comprises:
determining whether the operand address is within a defined range of addresses.

3. The method of claim 2, wherein a minimum address register stores a value indicating the minimum address of the defined range of addresses and a maximum address register stores a value indicating the maximum address of the defined range of addresses.

4. The method of claim 1, wherein selectively sourcing data from the extended register of the extended register file using the pointer stored in the referenced register comprises:
retrieving a first data value from the referenced register; and
retrieving a second data value from the extended register based on the first data value; and
communicating the second data value as source data to execution logic.

5. The method of claim 1, further comprising:
selectively sourcing data from the referenced register responsive to determining that the operand address references a register not among the subset of registers in the primary register file.

6. The method of claim 1, further comprising:
selectively writing data to a target extended register of the extended register file using the pointer stored in the referenced register that references the target extended register when the operand address corresponds to a target operand address and the referenced register is among the subset of registers in the primary register file.

7. The method of claim 1, wherein the instruction comprises operand addresses of n-bits and the primary register file comprises $2^n$ registers.

8. The method of claim 7, wherein each primary register stores m-bits of data, and the extended register file comprises $2^m$ extended registers.

9. The method of claim 1, wherein the instruction is a 32 bit instruction and includes three 5-bit source operand addresses and a 5-bit target operand address, wherein the primary register file comprises 32 registers of 10 bits each and the extended register file comprises 1024 extended registers.

10. The method of claim 1, wherein determining whether the operand address references a register among a subset of registers in a primary register file comprises:
accessing a bit map stored in a register that indicates whether each register of the primary register file is a register of the subset.

11. The method of claim 1, wherein determining whether the operand address references a register among the subset of registers in the primary register file comprises:
analyzing an opcode of the instruction to determine whether the instruction is of a particular type, wherein determining that the operand address references a register among the subset of registers in the primary register file is based on whether the instruction is of the particular type.

12. A circuit arrangement, comprising:
execution logic configured to execute instructions;
an extended register file comprising a plurality of extended registers;
a primary register file comprising a plurality of registers, wherein the plurality of registers includes first and second subsets; and
control logic configured to:
in response to a first instruction that references a first register in the first subset, cause the execution logic to use data stored in an extended register referenced by a pointer stored in the first register as source data when executing the first instruction.

13. The circuit arrangement of claim 12, wherein the control logic is further configured to:

in response to a second instruction that references a second register in the second subset, cause the execution logic to use data stored in the second subset as source data when executing the second instruction.

14. The circuit arrangement of claim 12, wherein the control logic is further configured to:
   determine whether the first register is in the first subset based at least in part on whether an operand address of the instruction referencing the first register is within a predefined range of addresses.

15. The circuit arrangement of claim 14, further comprising:
   a minimum address register configured to store a value indicating a minimum address of the defined range of addresses; and
   a maximum address register configured to store a value indicating a maximum address of the defined range of addresses.

16. The circuit arrangement of claim 12, wherein the control logic is further configured to:
   retrieve a first data value from the first register;
   retrieve a second data value from the extended register based on the first data value; and
   communicate the second data value as source data to the execution logic.

17. The circuit arrangement of claim 12, wherein the control logic is configured to:
   in response to a third instruction that references a third register in the first subset as a target operand address, cause the execution logic to write data generated from execution of the third instruction in a target extended register referenced by a pointer stored in the third register.

18. The circuit arrangement of claim 12, wherein the first instruction comprises operand addresses of n-bits, and the primary register file comprises $2^n$ registers.

19. The circuit arrangement of claim 18, wherein each register of the primary register file stores m-bits of data, and the extended register file comprises $2^m$ extended registers.

20. The circuit arrangement of claim 12, wherein the first instruction is a 32 bit instruction and includes three 5-bit source operand addresses and a 5-bit target operand address, wherein the primary register file comprises 32 registers of 10 bits each, and the extended register file comprises 1024 extended registers.

21. The circuit arrangement of claim 12, further comprising:
   a register configured to store a bit map that indicates whether each register of the primary register is of the first subset,
   wherein the control logic is further configured to determine whether the first register is of the first subset based at least in part on the bit map.

22. The circuit arrangement of claim 12, wherein the control logic is further configured to determine whether the first register is of the first subset by determining whether the instruction is of a particular type based at least in part on an opcode of the instruction, and wherein determining whether the first register is of the first subset is based at least in part on whether the instruction is of the particular type.

23. A program product comprising a non-transitory computer readable medium and logic definition program code stored on the non-transitory computer readable medium and defining the circuit arrangement of claim 12 second subset as source data when executing the second instruction.

* * * * *